June 19, 1956 L. C. NOSCO 2,750,835
BORE GAGE ATTACHMENT FOR CONTOUR PROJECTOR
Filed Oct. 25, 1954 4 Sheets-Sheet 1
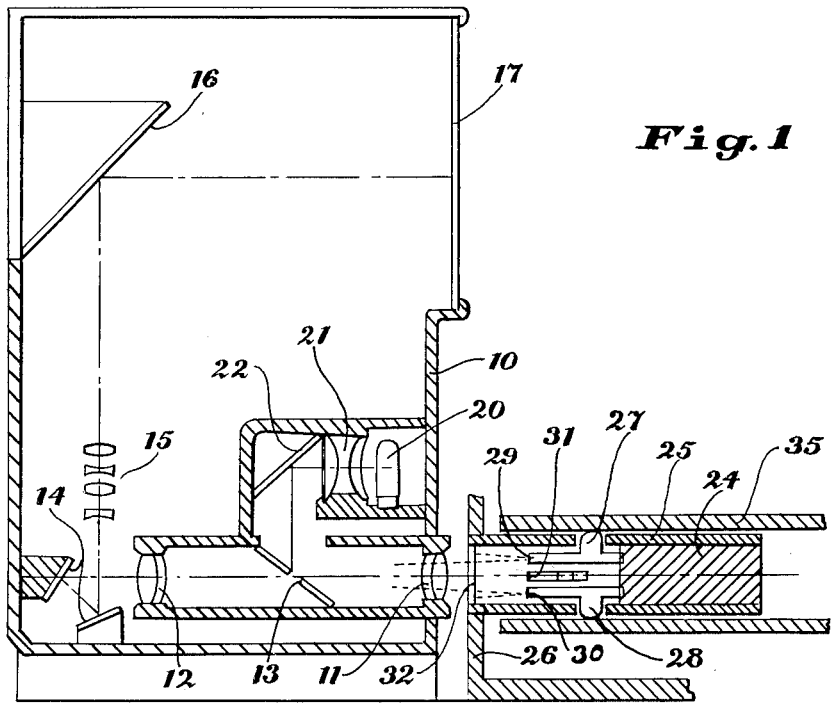
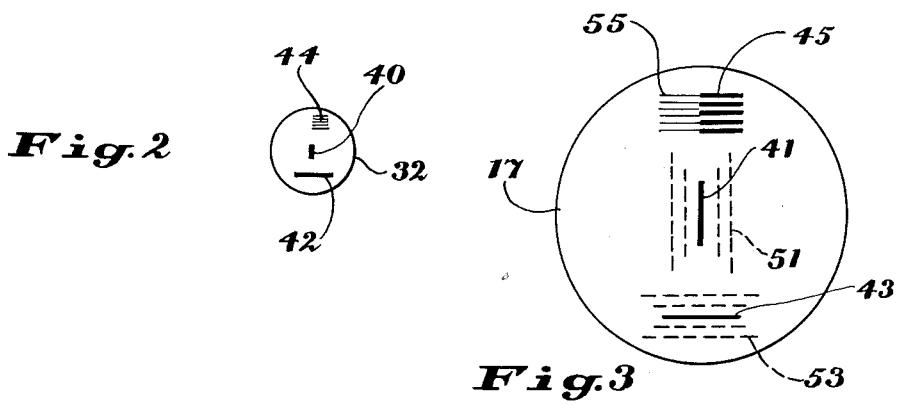
Louis C. Nosco
INVENTOR.

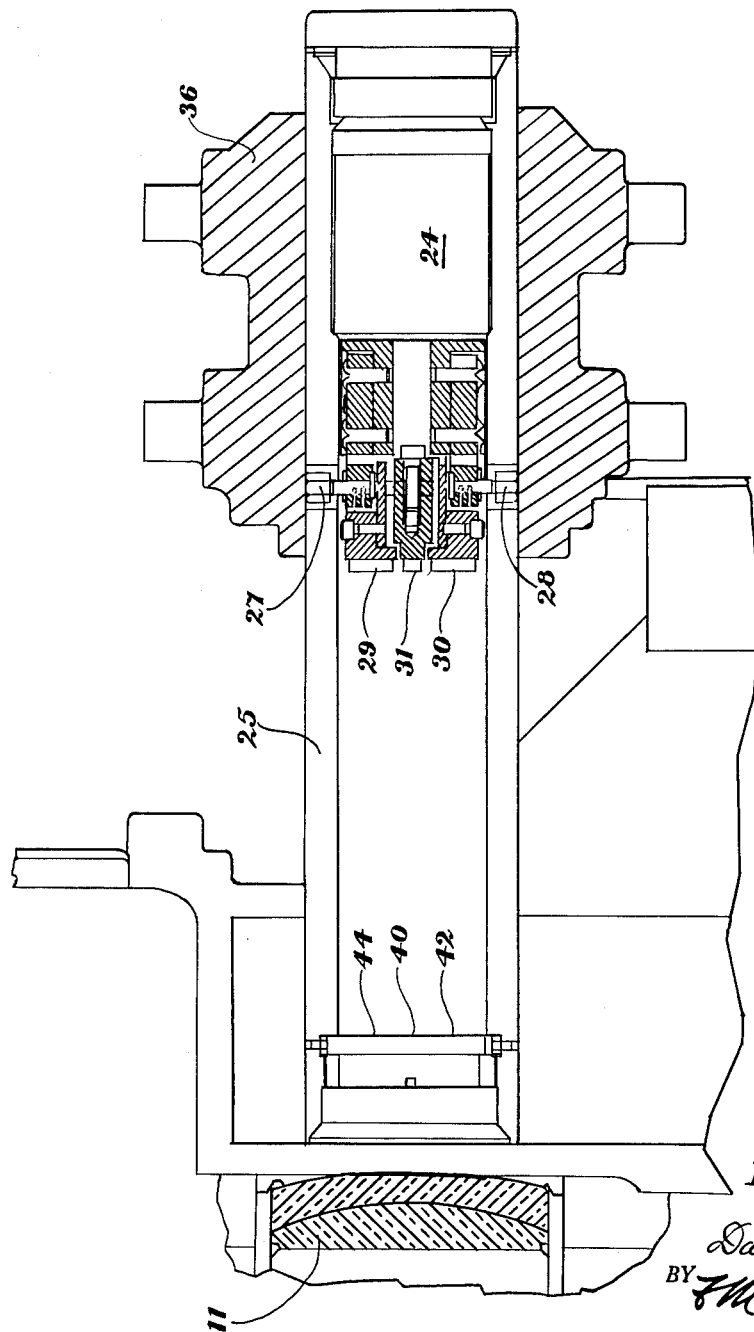

June 19, 1956 — L. C. NOSCO — 2,750,835
BORE GAGE ATTACHMENT FOR CONTOUR PROJECTOR
Filed Oct. 25, 1954 — 4 Sheets-Sheet 3
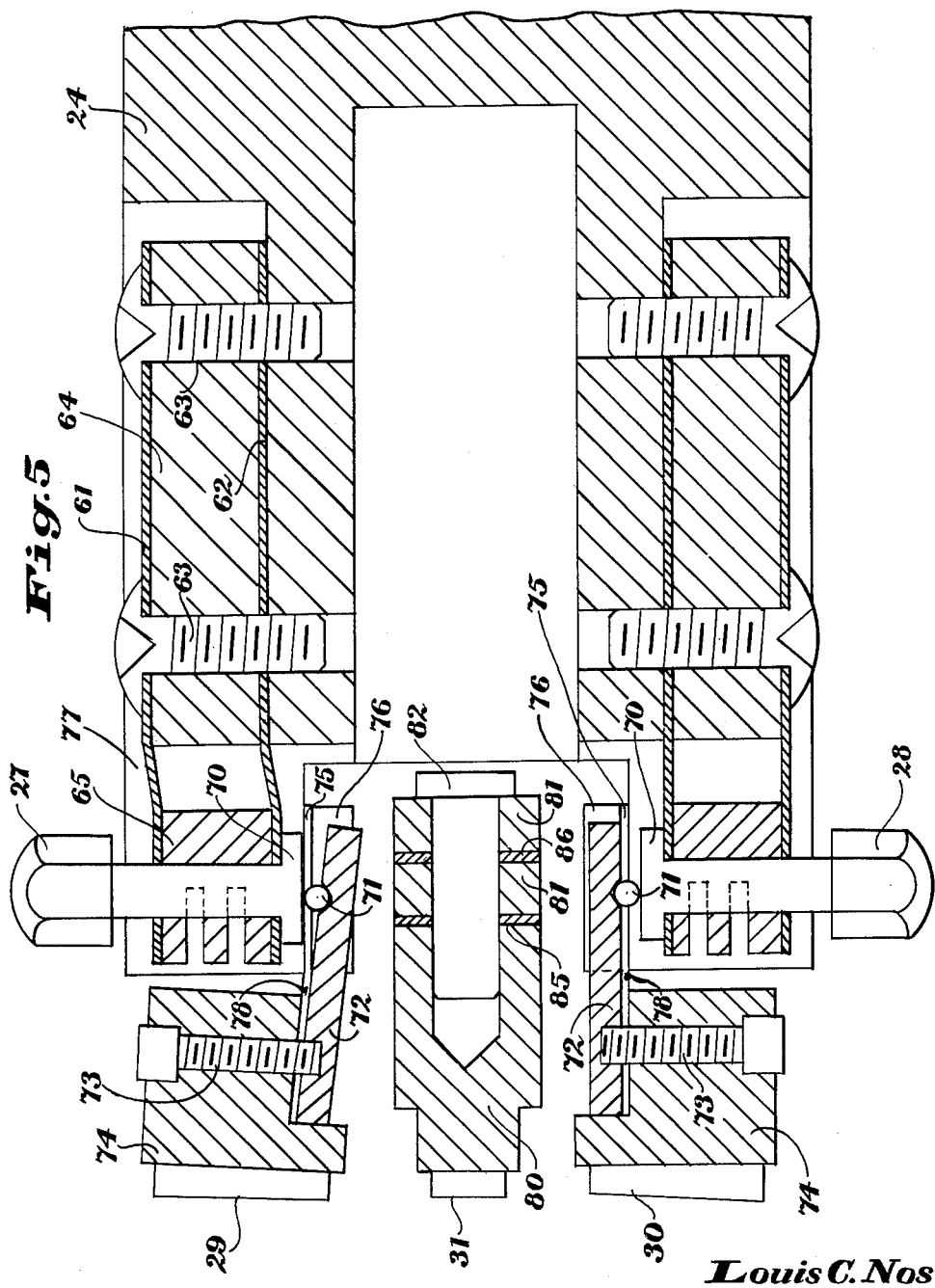
Louis C. Nosco
INVENTOR.
ATTORNEYS June 19, 1956  L. C. NOSCO  2,750,835
BORE GAGE ATTACHMENT FOR CONTOUR PROJECTOR
Filed Oct. 25, 1954  4 Sheets-Sheet 4

Louis C. Nosco
INVENTOR.

BY Daniel L. Wayne
F. M. Emerson Holmes
ATTORNEYS

United States Patent Office 2,750,835
Patented June 19, 1956

2,750,835

BORE GAGE ATTACHMENT FOR CONTOUR PROJECTOR

Louis C. Nosco, Rochester, N. Y., assignor to Eastman Kodak Company, Rochester, N. Y., a corporation of New Jersey Application October 25, 1954, Serial No. 464,378

2 Claims. (Cl. 88—14)

This invention relates to contour projectors and particularly to an attachment for contour projectors to permit gaging the internal dimensions of a cylinder or bore. Specifically it relates to an attachment for contour projectors of the type which provides episcopic illumination such as the projector described in U. S. Patent 2,552,280, Hudak.

The object of the invention is to provide a device for internal gaging, which is precise and simple to operate, and which permits successive measurements to be made extremely rapidly.

In general, the invention comprises a reticle and a mirror-feeler arrangement all mounted in front of an episcopic contour projector with the image of the reticle as seen in the mirror, in the focus plane of the projector. The feeler, as it engages the object to be tested tilts the mirror which shifts the reticle image on the projector screen.

According to the preferred embodiment of the invention, the attachment for the projector consists essentially of studs or feelers which engage the internal surface to be gaged and which tilt mirrors against a suitable spring pressure. Either a single or multiple reticle is included in the gage so as to be transilluminated by the episcopic light from the contour projector. The light from the reticle then strikes the gaging mirrors and is reflected back through the reticle into the optical system of the contour projector eventually forming an image of the reticle on the screen of the contour projector. This screen is provided with a scale or other marks corresponding to the reticle images and the distance of the reticle image from these marks is a measure of the tilt of the gaging mirror.

In one preferred form of the invention three reticles and three mirrors are used. The mirrors are in a vertical line, the top one being opeated by a feeler which engages the top of the cylinder being tested and the bottom one being operated by a feeler which engages the bottom of the cylinder. The center mirror is connected to two feelers engaging the sides of the cylinder. This center arrangement is particularly useful when the distance between two surfaces (e. g., the diameter of the bore) is the important feature rather than the absolute position of either surface. The center mirror is mounted on a block carried by two resilient flat members or reeds at different distances from the mirror with one reed connected to the feeler on one side and the other reed connected to the other feeler. Pressure on the two feelers compresses the unit and flexes the two reeds (concave toward each other) and thus tilts this center mirror.

The objects and the operation of the invention will be fully understood from the following description of a preferred embodiment thereof, when read in connection with the accompanying drawings in which:

Fig. 1 is a partly schematic vertical section of a contour projector incorporating the invention;

Figs. 2 and 3 respectively show the reticle and viewing screen employed in the arrangement shown in Fig. 1;

Fig. 4 is an enlarged vertical section of the attachment shown schematically in Fig. 1;

Fig. 5 is a greatly enlarged vertical section of the mirror and feeler assembly in this attachment.

Figure 6:
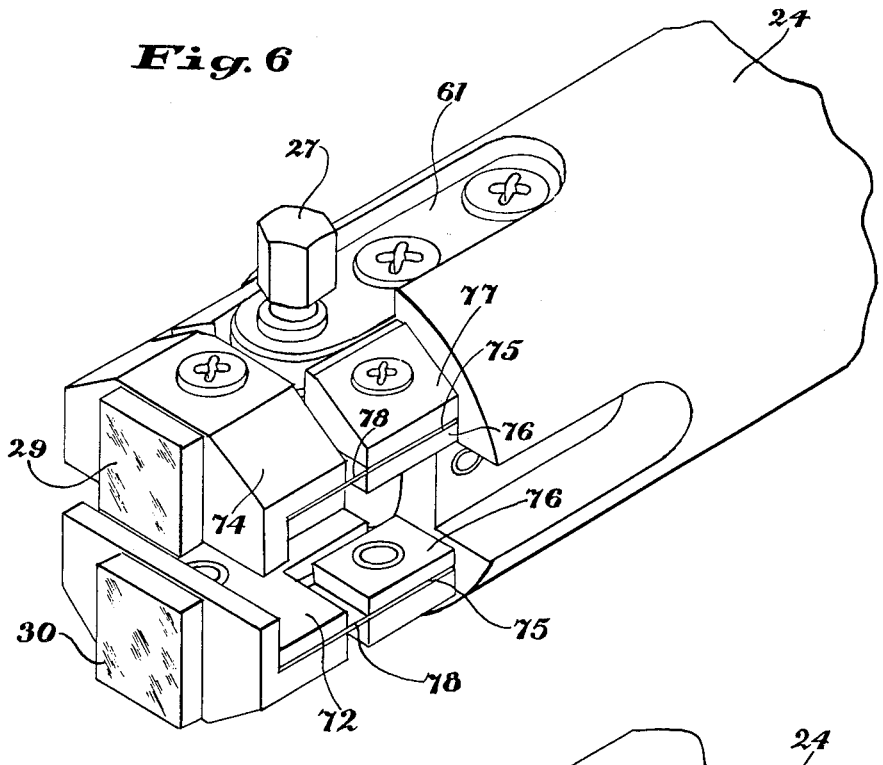
Figs. 6 and 7 are perspective views respectively of the vertical and horizontal parts of the mirror-feeler assembly.

In Figs. 1 to 4 a contour projector 10 normally receives light from an object to be gaged through a relay objective consisting of lenses 11 and 12 with a telecentric stop 13 between the lenses. This relay objective forms an aerial image of the object to be tested which is reflected by mirrors 14 and focused by an objective 15 and mirror 16 onto the screen 17 of the contour projector. Episcopic illumination of the object to be tested is provided by a lamp 20, a condenser lens 21 and mirror 22 which directs light to the reflecting surface in which the telecentric stop 13 is located and thence through the objective 11 to the object under examination.

When the present invention is used to test or gage the bore of a gun, cylinder, or other hollow object 35, the contour projector does not "examine" the bore directly. As far as the optical system is concerned, the object under examination is a reticle 32 which is transilluminated by the light coming through the objective 11. The light from the reticle 32 is reflected from tiltable mirrors 29, 30 and 31 back through the reticle and through the optical system of the contour projector to form an image of the reticle on the screen 17. The mirrors 29, 30 and 31 are carried by a support consisting of parts 24, 25 and 26 located so that the cylinder, gun bore, or other hollow object 35 to be tested may be easily slid over the tube 25. The internal surface of the cylinder 35 engages feelers 27 and 28, shown in Figs. 1, 4, 5 and 6 and feelers 90 and 91 shown in Fig. 7. The feeler 27 is spring mounted so as to tilt the mirror 29. The feeler 28 similarly operates the mirror 30 and the two feelers 90 and 91 cooperate to tilt the mirror 31.

The operation of the device is as follows. The reticle 32 consists of three parts 40, 42 and 44. The part 40 is a vertical line centrally located. When the light from this part of the reticle 40 strikes the mirror 31, it is reflected through the contour projector to form an image 41 on the screen 17. When this image 41 is centrally located between the marks 51 of the test pattern on the screen 17, this means that the mirror 31 is orthogonal to the light from the reticle 40, which in turn means that the horizontal diameter of the test bore 35 is correct. If this horizontal diameter is too large, the mirror 31 is tilted one way and if it is too small, the mirror 31 is tilted the other way, all as discussed below in connection with Fig. 7. This causes the image 41 to move to the right or left and the pattern 51 on the screen 17 is usually arranged to represent tolerance limits in the value of this horizontal diameter.

Light from the part 42 of the reticle which is a single horizontal line is reflected by the mirror 30 and through the optical system to form an image 43 on the screen which is examined with reference to a pattern 53. The mirror 30 is tilted by the feeler 28 and when the test piece has the correct dimensions the image 43 falls half way between the test marks 53. The optical system of the projector is such that the image 43 of the lower reticle 42 is at the bottom of the screen 17 as shown in Fig. 3.

The support or "horn" 25 is ground and honed to a high degree of straightness. Thus when the test piece is straight the top feeler 27 is always "correct" and the image 45 so indicates. Errors in diameter and roundness (ellipticity) are then indicated by the other reticle images 41 and 43. However if the test piece is "bell-mouthed" or "barrel-shaped," the feeler 27 moves up and down as the test piece is slid along the horn 25. Since these errors in shape are usually critical, reticle 44 and pattern 55 are made up in vernier relation. That is, the reticle 44 consists of five marks and the corresponding test pattern consists of six marks. If actual measurements are to be made involving more than one decimal unit, the vernier can be made up of nine vs. ten parts in the usual way.

Vertical diameter is measured by feelers 27 and 28 and deviations from the correct value are measured by adding the deviations indicated by the images 43 and 45.

Figure 7:
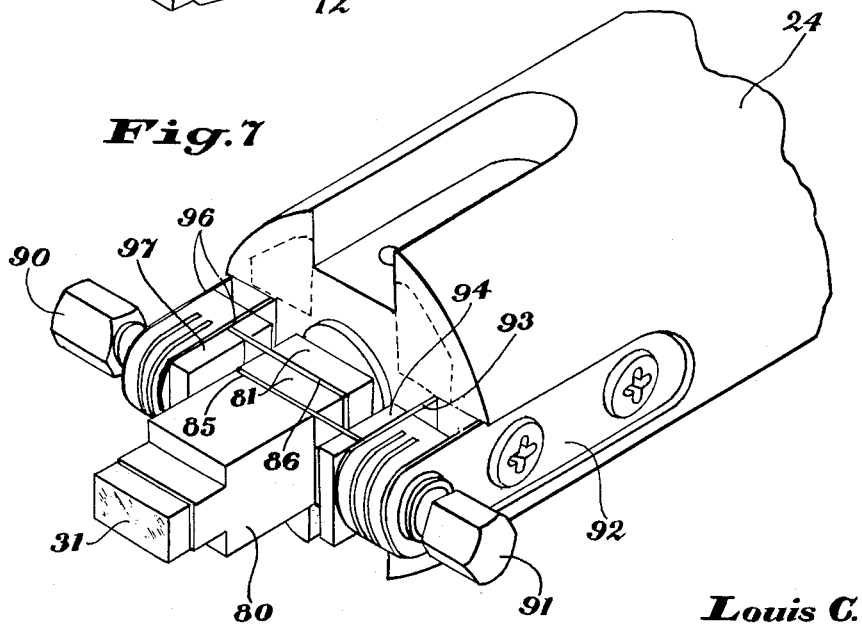

Figs. 5, 6 and 7 show a preferred mounting for the mirrors and feelers for the gaging attachment. The feelers 27 and 28 are clamped in blocks 65 to move vertically only. Each block 65 is supported by spring reeds 61 and 62 clamped by screws 63 between a block 64 and the central part 24 of the support or base of the attachment. As the feelers 27 and 28 are pressed by the unit under test, the end plates 70 of the feelers, through ball bearings 71, tilt T-shaped members 72 which are clamped by screws 73 to blocks 74 carrying the mirrors 29 and 30. The location of the T-shaped member 72 is best seen in the perspective view shown in Fig. 6.

The blocks 74 and the T-shaped members 72 which are clamped to the blocks 74 are tiltably mounted on springs 75 which flex at the point 78. These springs 75 are clamped between blocks 76 and extensions 77 which constitute part of the base 24 of the attachment.

In Fig. 5 the feeler 28 is shown in the position in which the T-shaped member 72 is horizontal. Actually but not necessarily the mirror 30 is mounted so as to be tilted slightly "upward" with respect to the vertical so that it reflects light upward when the feeler 28 is in this position. Slight pressure on the feeler 28 tilts the T-shaped member 72 and the mirror 30 so that when the feeler 28 is in the correct position, the mirror 30 is precisely oriented in a position which may be referred to as vertical although in practice it is purposely off vertical by 3½° for two reasons (mentioned below). Further pressure tilts the mirror "downward." The absolute orientation of the mirror is not critical since the screen patterns 51, 53 and 55 are located so as to compensate for the setting of the mirrors. The two reasons the mirror is tipped 3½° to the "vertical" which is orthogonal to the optic axis of the lens 11, are first that the episcopic illumination coming from the lamp 20 through the lens 11 is at a peak intensity slightly off axis and second that the tilting of the two mirrors 29 and 30 in opposite directions eliminates secondary or ghost images which might be caused for example by mirror 29 reflecting light from lower reticle mark 42.

Also, in Fig. 5 the feeler 27 is shown pressed somewhat downward so that the spring 75 is flexed at the point 78 and so that the T-shaped member 72 is not horizontal. The mirror 29 is thus tilted past the vertical and slightly "upward" so that it reflects light somewhat higher than normal indicating that the upper surface of the member being gaged is too low.

The distance of the ball 71 from the point of flexure 78 determines the mechanical magnification. For example, when the ratio of the focal length of the relay lens (made up of lenses 11 and 12 in Fig. 1) to this distance is 60:1 and the lens 15 gives a magnification of 50X, the effective magnification of the movement of the feeler 27 as measured at the screen 17 is 3000:1.

The mirror 31 is mounted somewhat differently from the mirrors 29 and 30 and responds to the distance between two feelers rather than to the setting of either one. This is best illustrated in Fig. 7. The mirror 31 is carried on a block 80 which by means of plates 81 and a screw 82 (shown in Fig. 5) is clamped to spring members or reeds 85 and 86. The reed 85 extends to one side and the reed 86 extends to the other side of the block 80. The feeler 91, mounted for horizontal movement only, is clamped by springs 92 and 93 to the base 24 of the attachment. This feeler 91 carries a block 94 with it which is clamped to the spring 85. Similarly the feeler 90 mounted on spring reeds 96 carries a block 97 which is clamped to the spring reed 86. As the feelers 90 and 91 are pressed together by the bore being gaged, the springs 85 and 86 are flexed concave toward each other so that the mirror 31 is tilted to one side. Actually the mirror 31 is mounted on the block 80 so as to be at a slight angle rather than orthogonal to the axis of the system when the feelers 90 and 91 are in their most extended position. When the test piece has exactly the right internal diameter, the feelers 90 and 91 are pressed toward each other tilting the mirror 31 slightly and bringing it to the position precisely orthogonal to the optic axis of the contour projector. If the test bore is too large, the feelers 90 and 91 are not pressed toward each other enough and if the test bore is too small, the feelers 90 and 91 are forced together too much. In either case the mirror 31 is oblique rather than orthogonal to the optic axis. Thus the tilt of the mirror and the position of the reticle image reflected therefrom is a measure of the horizontal internal diameter of the bore being gaged. As discussed in connection with mirrors 29 and 30, the mirror 31 may be at an angle of 3½° to precise orthogonality to take advantage of the added brightness at this angle. In this case the reticle mark 40 and the screen pattern 51 are located to allow for this slight angle.

I claim:

1. A gaging attachment for an episcopic projector of the type in which the episcopic illumination comes through at least the first objective of the projector lens system which forms an image on a screen carrying a gaging pattern, comprising a transparent sheet having a reticle thereon, means, for supporting the sheet with the reticle in alignment with, and at a fixed distance in front of, the objective, a mirror positioned to receive light from the reticle and to reflect it back through the reticle to the objective, the distance from the reticle to the mirror plus the distance of the mirror to the objective being such that the reticle image is focused on the screen, means for tiltably supporting the mirror in said position, and a spring urged feeler on the mirror support for resiliently engaging the surface to be gaged and for tilting said mirror.

2. A gaging attachment according to claim 1 for gaging the correctness of the distance between two surfaces of an object, in which the mirror support includes a rigid part carrying the mirror, two resilient flat members extending from opposite sides of the rigid part at different distances from the mirror, the other end of one of the flat members being connected to said feeler, which engages one of said two surfaces and a second feeler connected to the other end of the other of the flat members for engaging the other of the two surfaces, whereby pressure on the two feelers flexes both flat members and tilts the mirror.

References Cited in the file of this patent

UNITED STATES PATENTS 2,356,274    Roger _____ Aug. 22, 1944

FOREIGN PATENTS 393,892    Great Britain _____ June 15, 1933